United States Patent [19]
Leidal

[11] Patent Number: 5,690,376
[45] Date of Patent: Nov. 25, 1997

[54] VEHICLE SHADE

[76] Inventor: Andrew G. Leidal, P.O. Box 455, Breckenridge, Colo. 80424

[21] Appl. No.: 708,881

[22] Filed: Sep. 5, 1996

Related U.S. Application Data

[63] Continuation of Ser. No. 468,925, Jun. 6, 1995, abandoned.
[51] Int. Cl.⁶ .................................................. B60J 1/20
[52] U.S. Cl. ........................ 296/99.1; 296/95.1; 296/211
[58] Field of Search ............................ 296/136, 99.1, 296/95.1, 211

[56] References Cited

U.S. PATENT DOCUMENTS

| | | | |
|---|---|---|---|
| D. 339,781 | 9/1993 | Hassan | D12/156 |
| 2,548,068 | 4/1951 | Rountree et al. | 296/95.1 |
| 2,643,910 | 6/1953 | Lyon | 296/95.1 |
| 3,165,352 | 1/1965 | Hallock et al. | 296/100 |
| 4,106,399 | 8/1978 | Lawrence, Jr. | 98/2.14 |
| 4,290,640 | 9/1981 | Dalton | 296/95 |
| 4,630,860 | 12/1986 | Fuerst et al. | 296/217 |
| 4,741,572 | 5/1988 | Bauhof | 296/221 |
| 4,923,238 | 5/1990 | Morgulis et al. | 296/97.6 |
| 4,929,016 | 5/1990 | Kastanis | 296/136 |
| 4,948,191 | 8/1990 | Cao | 296/95.1 |
| 5,004,290 | 4/1991 | Kim | 296/99.1 |
| 5,039,159 | 8/1991 | Bonner | 296/211 X |
| 5,050,928 | 9/1991 | Bohm et al. | 296/216 |
| 5,078,446 | 1/1992 | Walter | 296/98 |
| 5,087,092 | 2/1992 | Antopolsky et al. | 296/95.1 |
| 5,114,204 | 5/1992 | Bernardo | 296/136 |
| 5,244,246 | 9/1993 | Cunningham | 296/136 |
| 5,275,460 | 1/1994 | Kraus | 296/136 |
| 5,429,405 | 7/1995 | Newbould | 296/95.1 |

FOREIGN PATENT DOCUMENTS

| | | | |
|---|---|---|---|
| 4307810 | 9/1994 | Germany . | |
| 0043025 | 4/1981 | Japan | 296/95.1 |
| 593812 | 12/1977 | Switzerland . | |

*Primary Examiner*—David M. Mitchell
*Assistant Examiner*—Kia M. Robinson
*Attorney, Agent, or Firm*—Chase & Yakimo

[57] ABSTRACT

A shade cover for a motor vehicle, which is usable when the motor vehicle is in operation as well as parked or in storage. The cover includes a rigid panel with a top surface, a bottom surface, a body portion, and an edge portion and has an area greater than the area of the vehicle's roof. The cover further includes a securing member for attaching the panel in a spaced relationship and at its bottom surface to the motor vehicle's roof. A reflective outer layer extends continuously across the top surface throughout the area of the panel. The body portion of the panel has an area substantially equal to the area of the vehicle's roof and presents the periphery from which the edge portion extends angularly outwardly and downwardly for providing shade to the vehicle's interior. At least a portion of the edge portion is transparent to allow a passenger of the vehicle to see therethrough. The cover also includes a ventilating louver member formed in the panel.

11 Claims, 7 Drawing Sheets

VEHICLE SHADE

This is a continuation of application(s) Ser. No. 08/468,925 filed on Jun. 6, 1995; now abandoned.

FIELD OF THE INVENTION

This invention relates to a vehicle shade or cover. More specifically, the shade attaches to a vehicle's roof and maintains the interior of the vehicle at ambient temperature both when the vehicle is in use and at rest.

BACKGROUND OF THE INVENTION

During the summer months, the interiors of vehicles become unbearably hot in warm climates due to the effect of the sun's rays. Shades insertable between the dashboard and front and/or rear windshields have become quite common and help to alleviate the discomfort to a vehicle's passengers upon entering a vehicle that has been parked outdoors in the sun over any period of time.

Shades of this type have several disadvantages, however. For instance, they do not shade the entire car, but only the front and/or rear windows. Thus, the temperature in the vehicle still rises to uncomfortable levels. Also, these shades cannot be used when the vehicle is in operation and thus, the vehicle's air-conditioning system must be relied on to cool its interior. If the vehicle has no air-conditioning system, ventilation is achieved only by rolling down the vehicle's windows.

Covers that fit over a vehicle's exterior to protect a vehicle while it is being stored are also common. However, these covers obviously cannot be used when the vehicle is in use since they cover the windshields.

Although some covers usable when a vehicle is in operation have been disclosed, these also do not shade each window of a vehicle. Furthermore, they are not aerodynamically designed, which is important since they are used when a vehicle is in operation.

SUMMARY OF THE INVENTION

Accordingly, a primary object of the subject invention is to provide a vehicle shade adapted to be mounted on the roof of a vehicle and having a rigid shade panel that overhangs each of a vehicle's windows and thereby provides shade to a vehicle's interior.

A further object of the subject invention is to provide a vehicle shade that reflects the sun's hot rays and maintains a vehicle's interior at or near ambient temperature.

Still a further object of the subject invention is to provide a vehicle shade usable when the vehicle is in operation as well as parked or in storage.

Yet a further object of the subject invention is to provide a vehicle shade that is easily mounted onto and dismounted from a vehicle's roof.

Yet a further object of the subject invention is to provide a vehicle shade mountable over a vehicle's roof that is aerodynamically designed.

Another object of the subject invention is to provide a vehicle shade that has only a few parts and is easy and inexpensive to manufacture.

Other objects and advantages of this invention will become apparent from the following description taken in connection with the accompanying drawings, wherein is set forth by way of illustration and example, an embodiment of this invention.

These objects are attained by providing a cover for a motor vehicle which includes a rigid panel having an outer surface, a first body portion, a second edge portion and ventilating louvers. The cover further includes securing brackets which secure the panel in a spaced relationship to a vehicle's roof. The panel's outer surface has a reflective material thereon to protect a vehicle from the sun's hot rays. The panel's body portion has an area substantially equal to the area of a vehicle's roof for attachment thereover by the brackets. The edge portion extends angularly outwardly and downwardly from the body portion's periphery and extends continuously around the periphery so that the panel has a width and length greater than the vehicle roof's width and length. The edge portion thereby provides shade to the vehicle's interior when attached thereto. The edge portion further includes a transparent portion extending angularly outwardly and downwardly preferably from the front edge of the periphery to allow the driver of the vehicle to see therethrough.

DETAILED DESCRIPTION

Figure 1:
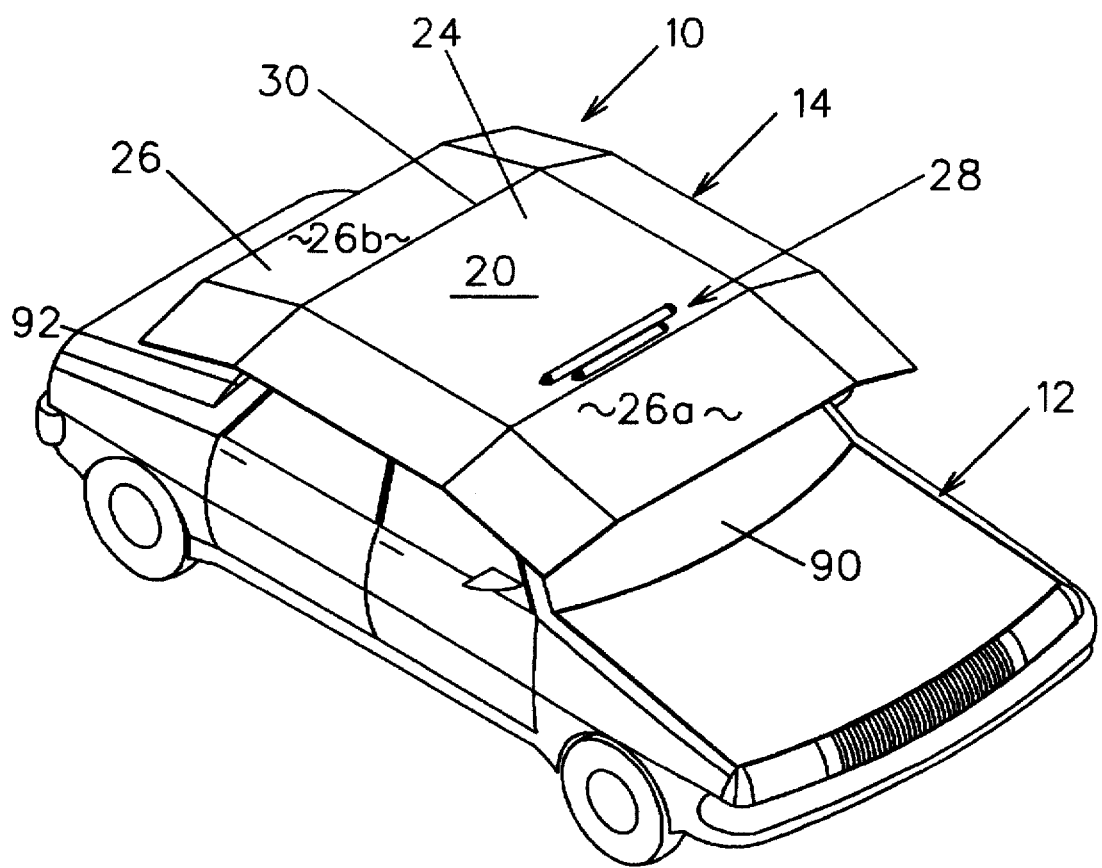
FIG. 1 is a perspective view of a cover in accordance with the present invention mounted to a car.
Figure 5:
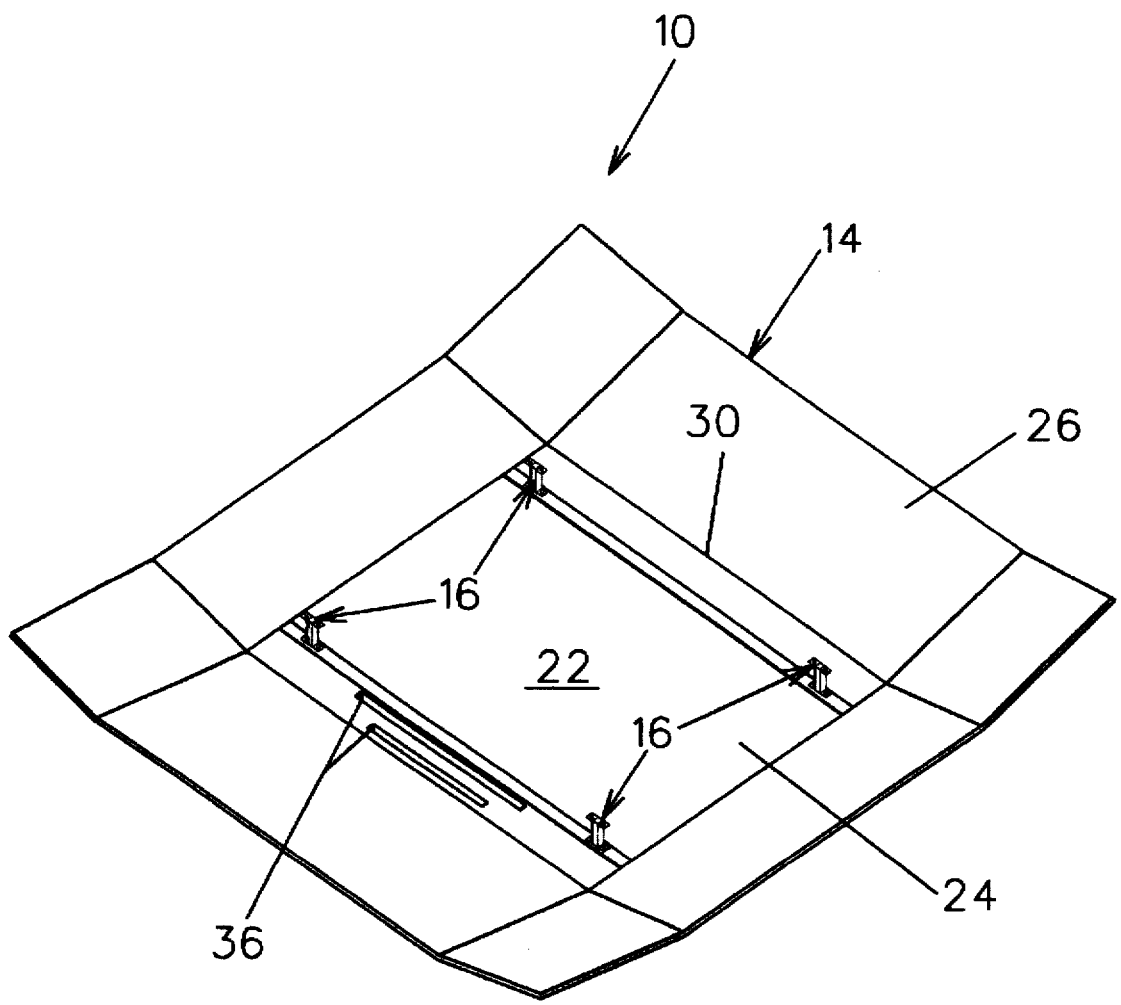
FIG. 5 is a bottom view of the cover of FIG. 1.
Figure 6:
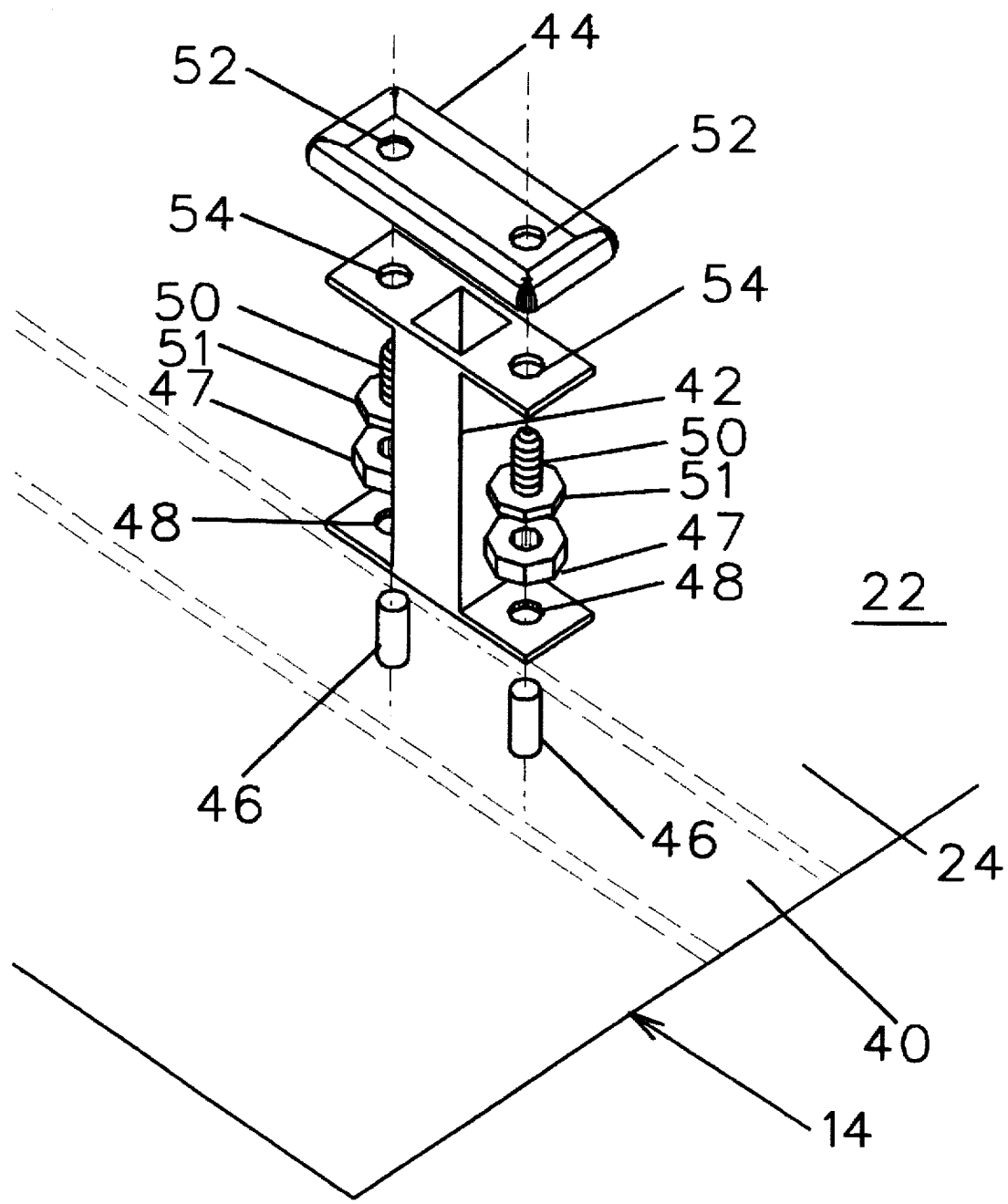
FIG. 6 is a partial fragmentary bottom view of the cover of FIG. 1 showing the securing bracket, which mounts the cover to a car, when disassembled.

A reflective cover and shade 10 for mounting on a motor vehicle, such as car 12, is shown in FIG. 1. Cover 10 includes a reflective panel 14 secured to the roof of car 12 by securing brackets 16, as seen in FIGS. 5 and 6. Cover 10 shades each window of car 12 and reflects the sun's rays and thereby maintains the interior temperature of car 12 at or near ambient temperature. Furthermore, cover 10 can be used when car 12 is being driven, is parked or is in storage.

Panel 14 includes a top or outer surface 20, bottom surface 22, center body portion 24, outer edge portion 26 and ventilating louver members 28 and is preferably composed of rigid plastic or polyethylene. Alternatively, panel 14 can be formed of reinforce fiberglass or any other lightweight, rigid material. Panel 14 is preferably rectangularly shaped to generally correspond to the shape of car's roof, but the area of panel 14 is greater than the area of the car's roof. Specifically, the width and length of panel 14 is greater than the width and length of the roof of car 12. Thus, panel 14 shades each of car's windows and its interior.

Panel 14 is attached to the car's roof by securing brackets 16 which space panel 14 apart from the car's roof to allow air to flow thereunder and out through louver members 28. This is beneficial for aerodynamic purposes and is also beneficial since the air circulation further helps to keep the roof of car 12 and thus, the interior of car 12 cool.

Top or outer surface 20 faces outwardly away from car 12 toward the sun when assembled thereto and has a reflective layer coated thereon, which preferably extends continuously across the entire outer surface 20. Bottom surface 22 faces the roof of car 12 when cover 10 is attached to car 12, as seen in FIG. 1.

Center body portion 24 is rectangularly shaped to substantially correspond to the shape of the roof of car 12 so that it has an area equal to the area of car's roof. Furthermore, the length and width of center body portion 24 is substantially equal to the length and width of the car's roof. Center body portion 24 presents a periphery 30 with a front edge 31 from which edge portion 26 extends, as best seen in FIGS. 1, 2 and 5.

Outer edge portion 26 preferably extends continuously around periphery 30 of center body portion 24 and is formed integrally therewith. Thus, edge portion 26 overhangs the car 12 and more specifically, overhangs each window of car 12 so that the interior of car is completely shaded. Preferably, outer edge portion 26 presents an 8" overhang at the car's side windshields, an 18" overhang at the car's rear windshield and a 24" overhang at the car's front windshield. Furthermore, outer edge portion 26 preferably extends angularly outwardly and downwardly from center body portion 24 to make cover 10 more aerodynamic when car 12 is being operated. For instance, the angle of segments 26a, 26b of outer edge portions 26 may approach or be substantially the same as the angle at which the corresponding front 90 and rear 92 windshields are mounted. This shade provided by outer edge portion 26 in combination with the reflective coating over outer surface 20 maintains the temperature within the interior of car 12 at or near ambient temperature even during the hottest part of the day.

Figure 4:
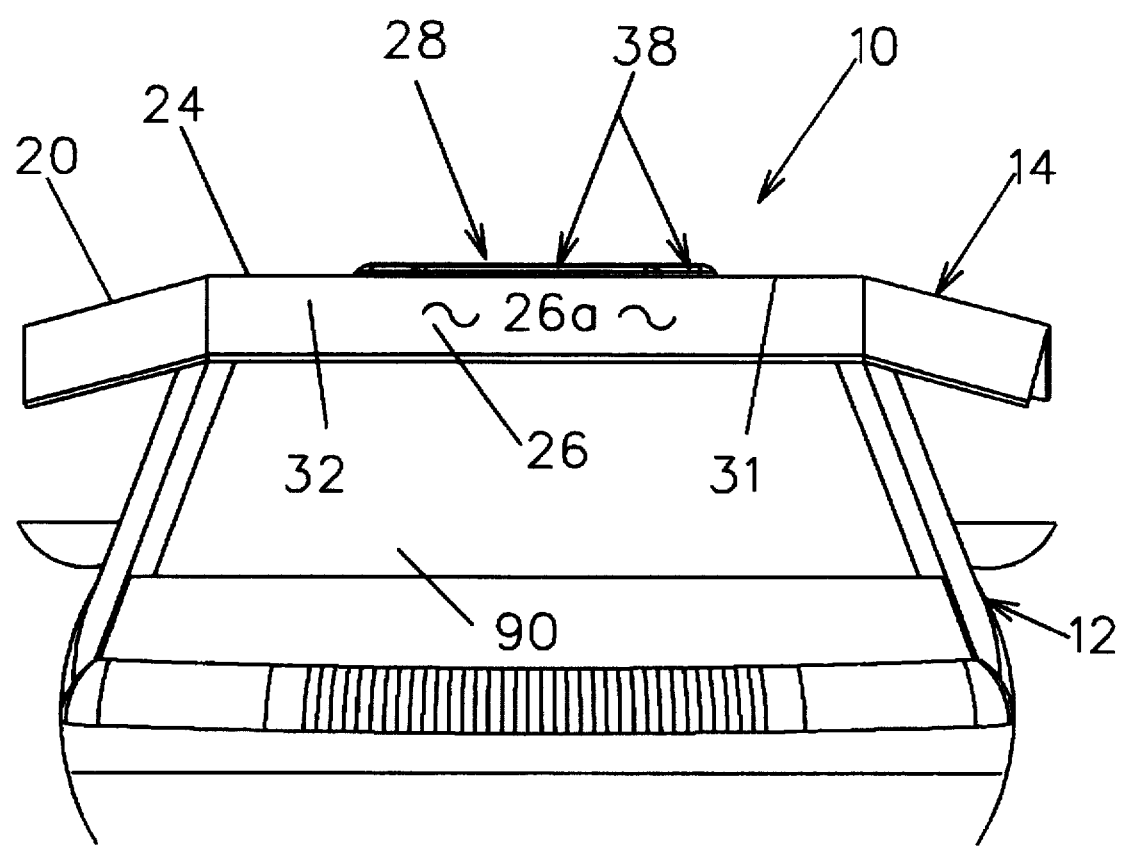
FIG. 4 is a front view of the cover of FIG. 1 mounted to a car.

Outer edge portion 26 preferably includes a see-through or transparent portion 32 which extends from front edge 31 of periphery 30 over the car's front windshield, as seen in FIG. 4. Although cover 10 does not completely obstruct a driver's line of sight, transparent portion 32 allows the driver to see through cover 10 if necessary. An additional transparent portion 32 could be formed at outer edge portion 26 which extends over any of the other windshields of car 12 if desired. Transparent portion 32 is preferably formed by simply removing the dyes from the rigid molded plastic of cover 10.

Figure 2:
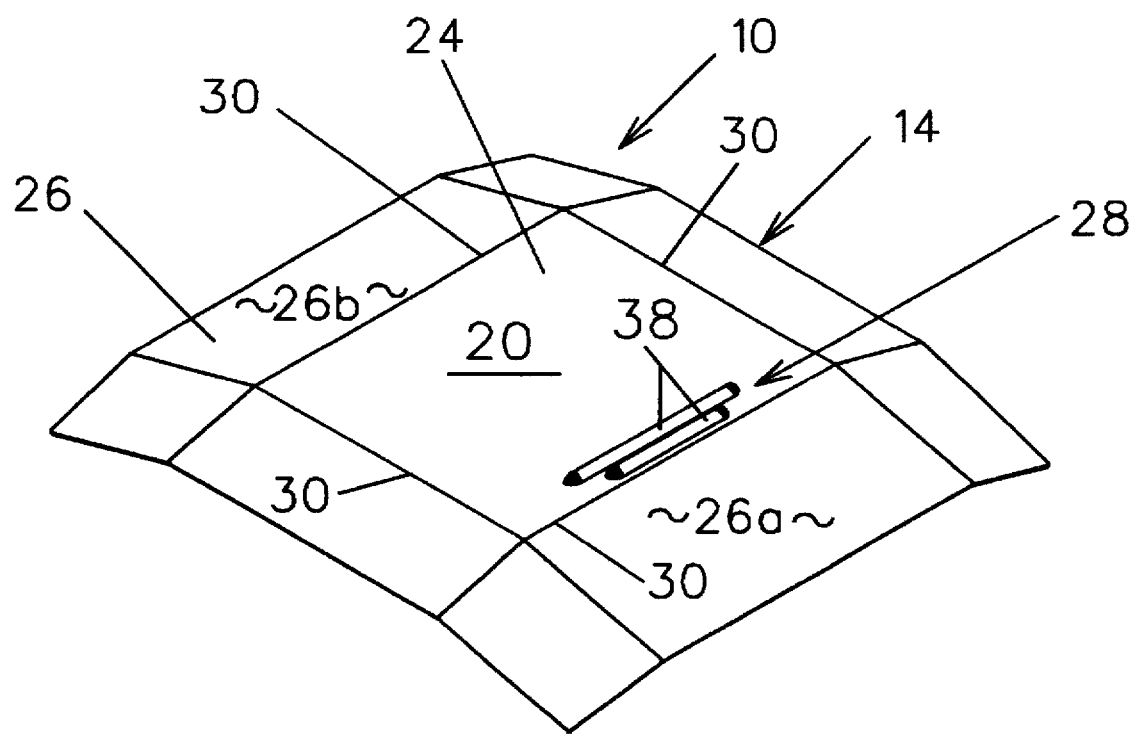
FIG. 2 is a perspective view of the cover of FIG. 1.
Figure 3:
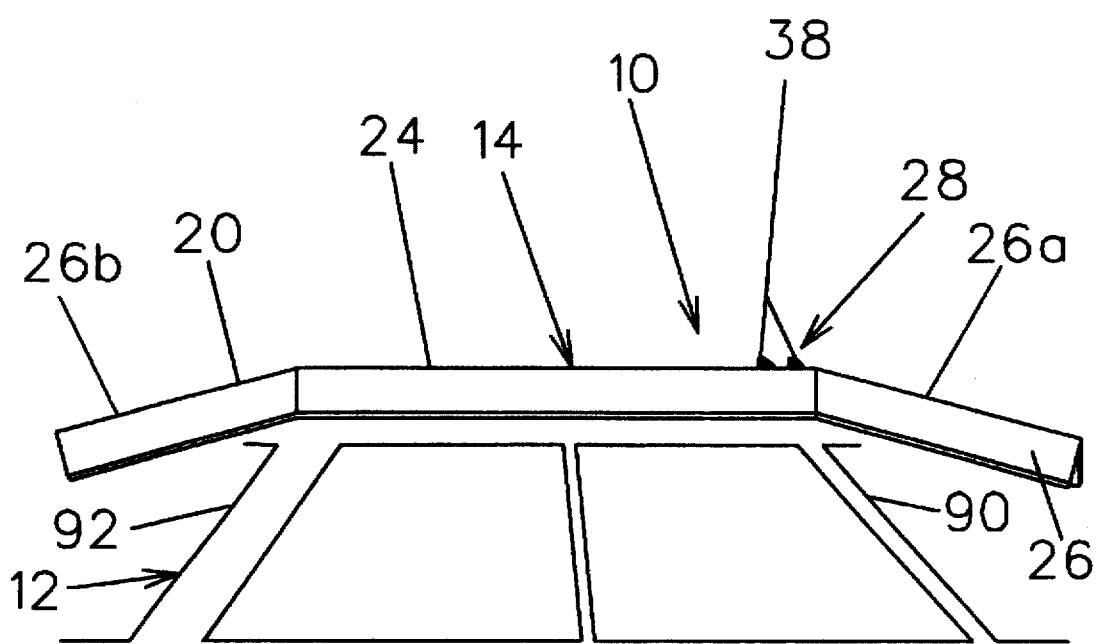
FIG. 3 is a side view of the cover of FIG. 1 mounted to a car.

Ventilating louver members 28 are securably attached to the top surface 20 of cover 10 at the center body portion 24 adjacent front edge 31 of periphery 30, as best seen in FIGS. 1, 2 and 4. Louver members 28 further add to the aerodynamic, ventilating design of cover 10 and include slots 36 and louvers 38. See FIGS. 2–5.

Slots 36 preferably extend through panel 14 adjacent and parallel to front edge 31 of periphery 30 with one louver 38 fixedly attached to outer surface 20 of panel 14 around each slot 36. Louvers 38 help to circulate air from beneath panel 14 (or between panel 14 and the car's roof when panel 14 is attached thereto), through slots 36 and out toward the rear end of car 12 over the outer surface 20 of panel, when car 12 is moving forward.

Figure 7:
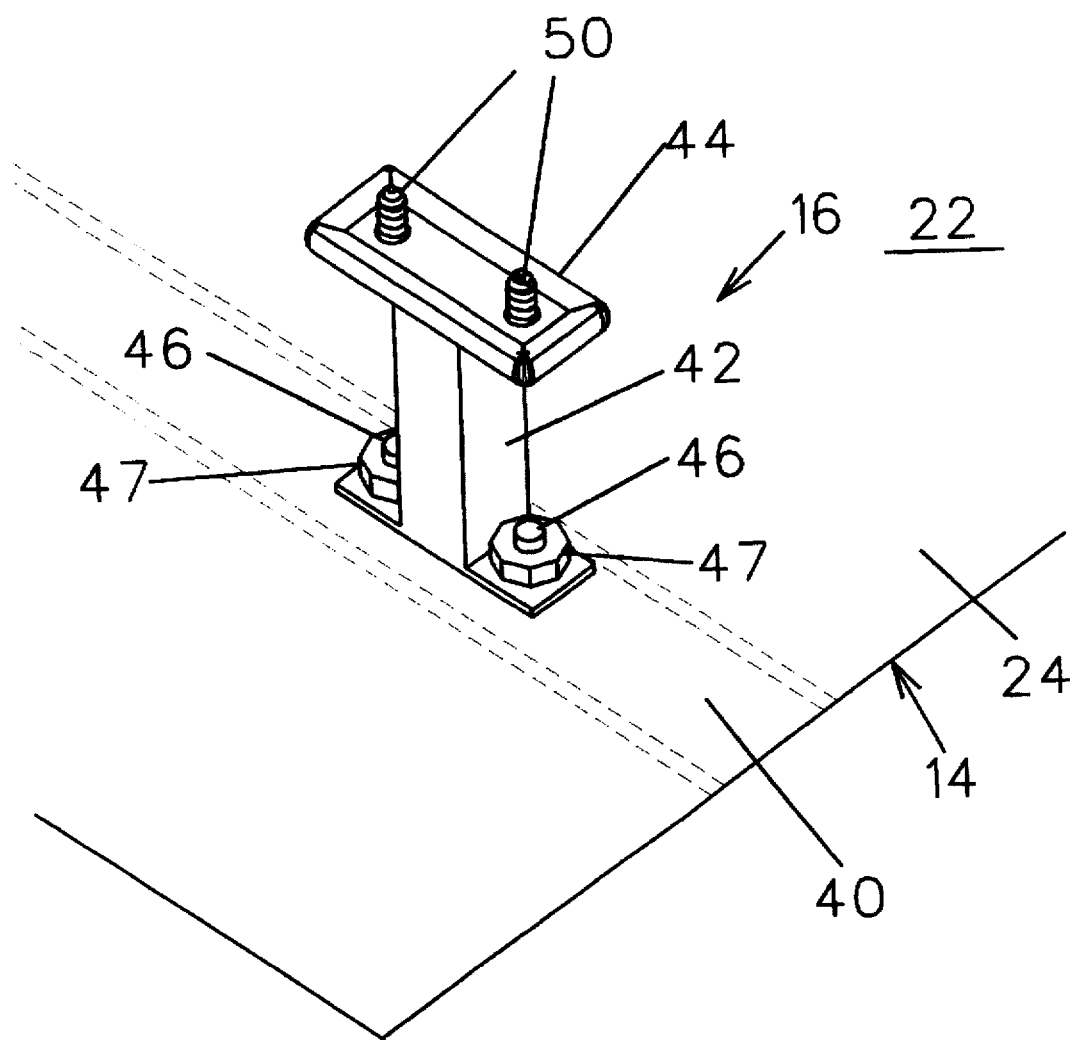
FIG. 7 is a partial fragmentary bottom view showing the securing bracket of FIG. 6 when assembled.

Securing brackets 16 attach panel 14 at its bottom surface 22 to the roof of car 12 in a spaced relationship therewith, which allows ventilation of cover 10. Securing brackets 16 preferably include mounting screw plates 40, mounting brackets 42, mounting spacers 44, screws 46 and nuts 47, as best seen in FIGS. 6 and 7.

Preferably, two screw plates 40 are spaced apart and securely attached to bottom surface 22 of panel 14 across its width parallel to one another, as in FIG. 5. Screw plates 40 securely mount screws 46, which extend through panel 14 and outwardly from screw plates 40 toward the car's roof. Screws 46 also extend through apertures 48 of mounting brackets 42 and secure panel 14 thereto via nuts 47. Mounting brackets 42 are secured to the roof of car 12 by screws 50 and nuts 51, such that screws 50 extend at least partially through the car's roof, through apertures 52 in mounting spacers 44 and through apertures 54 in mounting brackets 42 and are secured therein via nuts 51, as seen in FIGS. 6 and 7. Alternatively, panel 14 may be attached to a vehicle's preexisting ski rack, luggage rack, etc., by any common means.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A cover for a roof of a motor vehicle comprising:

a rigid panel having an outer surface, a first body portion, a second edge portion and means for ventilating; and means for securing said panel in a spaced relationship to the motor vehicle's roof;

said outer surface having a reflective material thereon to protect the motor vehicle from the sun's hot rays;

said body portion having an area substantially equal to an area of the motor vehicle's roof for attachment thereto by said means for securing, said body portion defined by a discrete periphery;

said edge portion depending from and extending angularly outwardly from said periphery continuously around said body portion so that said panel has a width and length greater than a width and a length of the motor vehicle's roof to provide shade to a motor vehicle's interior when attached thereto; and said edge portion including a front transparent segment extending angularly outwardly and downwardly from a front edge of said periphery and below a top edge of a motor vehicle's front windshield to allow a driver of the motor vehicle to see therethrough and a rear segment extending outwardly and downwardly from a rear edge of said periphery and below a top edge of a motor vehicle's rear windshield, said front and rear segments extending at generally the same angle of the corresponding front and rear windshields.

2. A cover as claimed in claim 1, wherein said means for ventilating includes at least one slot extending through said body portion adjacent said front edge.

3. A cover as claimed in claim 2, wherein said means for ventilating includes a louver attached to said outer surface of said body portion around said slot.

4. A cover as claimed in claim 1, wherein said panel is formed of rigid plastic.

5. A cover as claimed in claim 1, wherein said edge portion extends downwardly from said periphery.

6. A cover as claimed in claim 1, wherein said means for ventilating is formed in said body portion.

7. A cover for a roof of a motor vehicle, comprising:

a rigid panel with a top surface, a bottom surface, a body portion, an edge portion and having an area greater than an area of the motor vehicle's roof;

means for securing said panel in a spaced relationship and at its said bottom surface to the motor vehicle's roof;

a reflective outer layer extending continuously across said top surface throughout said area of said panel; and means for ventilating said panel;

said body portion having an area substantially equal to an area of the motor vehicle's roof and defined by a discrete periphery from which said edge portion depends and extends angularly outwardly and downwardly for providing shade to a motor vehicle's interior;

said edge portion including a front segment extending outwardly and downwardly relative to a top edge of a motor vehicle's front windshield and a rear segment extending outwardly and downwardly relative to a top edge of a motor vehicle's rear windshield, said front and rear segments extending at substantially the same angle at which the corresponding front and rear windshields are mounted;

at least a portion of said segments of said edge portion being transparent to allow a passenger of the motor vehicle to see therethrough.

8. A cover as claimed in claim 7, wherein said transparent portion of said edge portion extends from a front edge of said periphery of said body.

9. A cover as claimed in claim 7, wherein said means for ventilating includes louvers formed in said body adjacent said front edge.

10. A cover for a roof of a motor vehicle, comprising:

a rigid panel with a top surface, a bottom surface, a body portion, an edge portion and having an area greater than an area of the motor vehicle's roof;

means for securing said panel in a spaced relationship to the motor vehicle's roof; and a reflective outer layer extending continuously across the top surface throughout said area of said panel;

said body portion having an area substantially equal to an area of the motor vehicle's roof and defining a discrete periphery;

said edge portion including front, side and rear segments depending from and extending outwardly and downwardly from said periphery for providing shade over a motor vehicle's corresponding front, side and rear windshields, said segments extending at substantially the same angle at which a motor vehicle's corresponding front and rear windshields are mounted for aerodynamic purposes;

at least a portion of said edge portion being transparent to allow a passenger of the motor vehicle to see therethrough.

11. A cover as claimed in claim 10, further comprising:

a means for ventilating formed in said body portion.

* * * * *